(12) United States Patent
Hosaka et al.

(10) Patent No.: US 9,563,291 B2
(45) Date of Patent: Feb. 7, 2017

(54) FILM FOR PEN INPUT DEVICE, AND PEN INPUT DEVICE

(71) Applicant: Konica Minolta, Inc., Tokyo (JP)

(72) Inventors: Kenta Hosaka, Sagamihara (JP); Yasuhiko Yamaguchi, Hino (JP); Takamasa Niwa, Hachioji (JP); Masayuki Inoue, Hino (JP); Keiichiro Hyodo, Kokubunji (JP); Tetsuhiro Shibata, Hamamatsu (JP)

(73) Assignee: KONICA MINOLTA, INC., Tokyo (JP)

( * ) Notice: Subject to any disclaimer, the term of this patent is extended or adjusted under 35 U.S.C. 154(b) by 141 days.

(21) Appl. No.: 14/558,188

(22) Filed: Dec. 2, 2014

(65) Prior Publication Data

US 2015/0160745 A1    Jun. 11, 2015

(30) Foreign Application Priority Data

Dec. 5, 2013   (JP) ................................ 2013-252543

(51) Int. Cl.
  *G06F 3/0354* (2013.01)
  *G06F 3/041* (2006.01)
(52) U.S. Cl.
  CPC ........... *G06F 3/03545* (2013.01); *G06F 3/041* (2013.01); *G06F 2200/1634* (2013.01); *Y10T 428/24355* (2015.01)
(58) Field of Classification Search
  CPC ............. G06F 2200/1634; G06F 3/03545; G06F 3/041
  See application file for complete search history.

(56) References Cited

U.S. PATENT DOCUMENTS

2013/0164543 A1*  6/2013  Shibuya ............... G06F 1/1643
                                                  428/428

FOREIGN PATENT DOCUMENTS

| JP | 2003-296008 A | 10/2003 |
| JP | 2013-077135 A | 4/2013 |
| JP | 2013-152714 A | 8/2013 |
| WO | WO03/067416 A1 | 8/2003 |

* cited by examiner

*Primary Examiner* — Andrew Sasinowski
*Assistant Examiner* — Chun-Nan Lin
(74) *Attorney, Agent, or Firm* — Lucas & Mercanti, LLP

(57) ABSTRACT

A film of a pen input device is provided, and a point determined by a combination of a static friction coefficient value x and a kinetic friction coefficient value y falls within a region including a line segment and the neighborhood of the line segment in a coordinate system showing the static friction coefficient on the X-axis and the kinetic friction coefficient on the Y-axis, the line segment being expressed as $y=0.3071x+0.0496$ $0.26 \geq x \geq 0.13$, the following conditions being satisfied:

$0.16 \geq$ the static friction coefficient value $x \geq 0.10$ $0.100 \geq$ the kinetic friction coefficient value $y \geq 0.080$, the size a, the height b, and the pitch c of concavities and convexities in the surface satisfying the following conditions:

$20 \ \mu m \geq a \geq 16 \ \mu m$ $0.9 \ \mu m \geq b \geq 0.4 \ \mu m$ $30 \ \mu m \geq c \geq 26 \ \mu m$.

8 Claims, 17 Drawing Sheets

FIG. 2

| | Fs | Fk | A | B | C | D | E | F | ABC | DEF | PLOT (FRICTION COEFFICIENT POINT) |
|---|---|---|---|---|---|---|---|---|---|---|---|
| FILM 1 | 0.130 | 0.090 | 7 | 7 | 7 | 2 | 1 | 2 | 7.0 | 1.7 | P1 |
| FILM 2 | 0.200 | 0.110 | 5 | 6 | 6 | 5 | 6 | 5 | 5.7 | 5.3 | P2 |
| FILM 3 | 0.260 | 0.130 | 1 | 1 | 3 | 7 | 7 | 7 | 1.7 | 7.0 | P3 |
| COMPARATIVE EXAMPLE 1 | 0.278 | 0.106 | 2 | 3 | 1 | 3 | 3 | 4 | 2.0 | 3.3 | P4 |
| COMPARATIVE EXAMPLE 2 | 0.180 | 0.075 | 3 | 2 | 3 | 2 | 3 | 2 | 2.7 | 2.3 | P5 |
| COMPARATIVE EXAMPLE 3 | 0.260 | 0.099 | 2 | 3 | 1 | 3 | 3 | 3 | 2.0 | 3.0 | P6 |
| COMPARATIVE EXAMPLE 4 | 0.330 | 0.135 | 1 | 1 | 3 | 4 | 3 | 3 | 1.7 | 3.3 | P7 |
| COMPARATIVE EXAMPLE 5 | 0.160 | 0.118 | 3 | 4 | 3 | 3 | 2 | 2 | 3.3 | 2.3 | P8 |
| COMPARATIVE EXAMPLE 6 | 0.100 | 0.058 | 2 | 2 | 3 | 1 | 2 | 2 | 2.3 | 1.7 | P9 |
| COMPARATIVE EXAMPLE 7 | 0.086 | 0.055 | 1 | 2 | 2 | 1 | 1 | 1 | 1.7 | 1.0 | P10 |
| COMPARATIVE EXAMPLE 8 | 0.138 | 0.143 | 2 | 1 | 2 | 1 | 3 | 2 | 1.7 | 2.0 | P11 |

FIG. 10

| | Fe | Fk | \multicolumn{6}{c}{EVALUATORS} | \multicolumn{2}{c}{AVERAGES AMONG THREE} | PLOT (FRICTION COEFFICIENT POINT) |
|---|---|---|---|---|---|---|---|---|---|---|---|

| | Fe | Fk | A | B | C | D | E | F | ABC | DEF | PLOT (FRICTION COEFFICIENT POINT) |
|---|---|---|---|---|---|---|---|---|---|---|---|
| FILM 1 | 0.130 | 0.080 | 7 | 7 | 7 | 2 | 1 | 2 | 7.0 | 1.7 | P1 |
| FILM 2 | 0.200 | 0.110 | 9 | 8 | 8 | 8 | 9 | 8 | 8.7 | 8.3 | P2 |
| FILM 3 | 0.260 | 0.130 | 1 | 1 | 3 | 7 | 7 | 7 | 1.7 | 7.0 | P3 |
| COMPARATIVE EXAMPLE 9 | 0.200 | 0.070 | | | | | | | | | P12 |
| COMPARATIVE EXAMPLE 10 | 0.180 | 0.120 | | | | | | | | | P13 |
| COMPARATIVE EXAMPLE 11 | 0.160 | 0.080 | | | | | | | | | P14 |

FIG. 14

| PLOT (FRICTION COEFFICIENT POINT) | | HAZE | Fs | Fk |
|---|---|---|---|---|
| FILM 2 | P2 | 8.1 | 0.200 | 0.110 |
| FILM 3 | P3 | 15.7 | 0.260 | 0.130 |
| COMPARATIVE EXAMPLE 1 | P4 | 31.1 | 0.276 | 0.106 |
| COMPARATIVE EXAMPLE 3 | P6 | 60.0 | 0.260 | 0.099 |

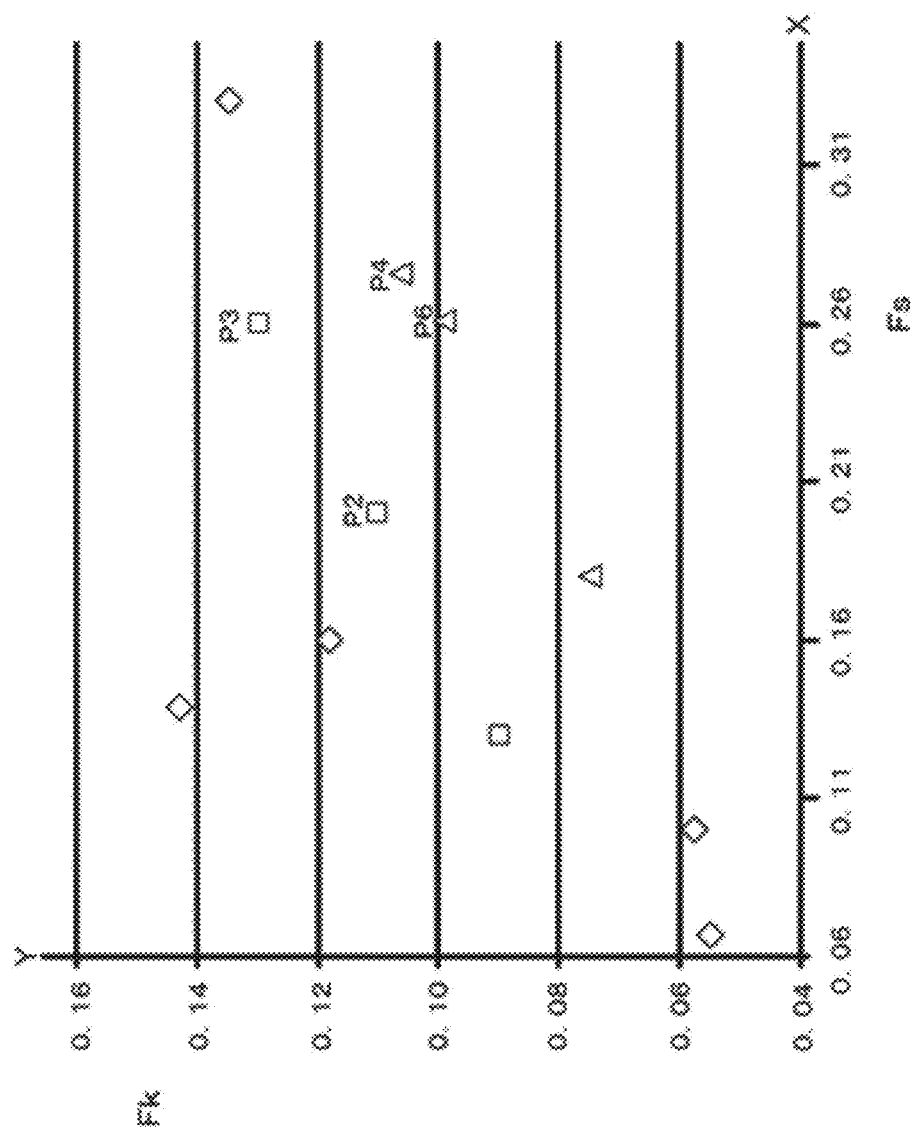

FILM FOR PEN INPUT DEVICE, AND PEN INPUT DEVICE

The entire disclosure of Japanese Patent Application No. 2013-252543 filed on Dec. 5, 2013 including description, claims, drawings, and abstract are incorporated herein by reference in its entirety.

BACKGROUND OF THE INVENTION

Field of the Invention

The present invention relates to a film placed on the input surface of an input device that receives inputs hand-written with a pen, and a pen input device that uses the film.

Description of the Related Art

There exist various kinds of input devices that receive inputs hand-written with a pen, such as a touch-panel display and an input pad. In such input devices, there is a demand for comfortable writing at a time of inputting with a pen. Writing involves various aspects of a writing material, such as slipperiness, softness, and roughness. For example, JP 2003-296008 A (WO 2003/67416 A) discloses a surface material for a pen input device that has improved slipperiness. JP 2013-77135 A discloses a touch-panel sheet material that includes a self-restoring resin layer, and is 0.05 or less in the difference between the static friction coefficient and the kinetic friction coefficient. JP 2013-152714 A (US 2013/0,164,543 A) discloses a touch-sensor overall panel that includes a high-resistance layer made of tin oxide and titanium oxide, and an insulating layer formed on the high-resistance layer and made of a hardening resin or an inorganic oxide, and has a static friction coefficient of 0.2 or smaller and a kinetic friction coefficient of 0.2 or smaller.

The above mentioned surface material disclosed in JP 2003-296008 A has an improved feel of writing that prioritizes slipperiness. However, the feel of writing is not sufficiently comfortable, and there is still a demand for an input surface that realizes writing to be more preferred by users.

The above mentioned sheet material disclosed in JP 2013-77135 A contains a self-restoring resin. Therefore, the soft input surface is liable to irreparable damage or is easily modified. The relationship between the static friction coefficient and the kinetic friction coefficient that provide comfortable writing naturally differs from that in a case where a resin with poor self-restorability is used, but this aspect is not discussed in this literature.

In the above mentioned overall panel disclosed in JP 2013-152714 A, the high-resistance layer is formed by a vapor phase deposition method such as sputtering, and the insulating layer is formed by coating or sputtering as disclosed. However, how the friction coefficients are adjusted is not disclosed at all. If the friction coefficients are controlled by adjusting film forming conditions, product quality will become unstable. Moreover, improvement of operability of a touch sensor is an objective in the literature, and the feel of writing with a writing tool is not fully discussed.

SUMMARY OF THE INVENTION

The present invention has been developed in view of the above circumstances, and an object thereof is to provide a film that is placed on the input surface of a pen input device, and realizes more preferred writing.

To achieve at least one of the above-mentioned objects, according to an aspect, a film for a pen input device reflecting one aspect of the present invention is placed on the input surface of a pen input device, wherein a point determined by a combination of a static friction coefficient value x and a kinetic friction coefficient value y obtained when an input pen is moved on the surface of the film with an applied load of 250 g at a speed of 5 cm/sec at ordinary temperature and pressure falls within a region including a line segment and the neighborhood of the line segment in a coordinate system showing the static friction coefficient on the X-axis and the kinetic friction coefficient on the Y-axis, the line segment being expressed as $$y=0.3071x+0.0496$$

$$0.26 \geq x \geq 0.13,$$

the static friction coefficient value x and the kinetic friction coefficient value y falling within the ranges expressed as $$0.16 \geq \text{the static friction coefficient value } x \geq 0.10$$

$$0.100 \geq \text{the kinetic friction coefficient value } y \geq 0.080,$$

the size a, the height b, and the pitch c of concavities and convexities in the surface falling within the ranges expressed as $$20 \ \mu m \geq a \geq 16 \ \mu m$$

$$0.9 \ \mu m \geq b \geq 0.4 \ \mu m$$

$$30 \ \mu m \geq c \geq 26 \ \mu m.$$

To achieve at least one of the above-mentioned objects, according to an aspect, a film for a pen input device reflecting one aspect of the present invention is placed on the input surface of a pen input device, wherein a point determined by a combination of a static friction coefficient value x and a kinetic friction coefficient value y obtained when an input pen is moved on a surface of the film with an applied load of 250 g at a speed of 5 cm/sec at ordinary temperature and pressure falls within a region including a line segment and a neighborhood of the line segment in a coordinate system showing a static friction coefficient on the X-axis and a kinetic friction coefficient on the Y-axis, the line segment being expressed as $$y=0.3071x+0.0496$$

$$0.26 \geq x \geq 0.13,$$

the static friction coefficient value x and the kinetic friction coefficient value y falling within the ranges expressed as $$0.29 \geq \text{the static friction coefficient value } x \geq 0.0496$$

$$0.140 \geq \text{the kinetic friction coefficient value } y \geq 0.120,$$

the size a, the height b, and the pitch c of concavities and convexities in the surface falling within the ranges expressed as $$30 \ \mu m \geq a \geq 26 \ \mu m$$

$$5.6 \ \mu m \geq b \geq 1.9 \ \mu m$$

$$18 \ \mu m \geq c \geq 14 \ \mu m.$$

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2 is a list showing evaluation results;

FIG. 10 is a list showing the static friction coefficients, the kinetic friction coefficients, and the like of films 1 through 3 and Comparative Examples 9 through 11;

FIG. 14 is a list showing measured haze values and the values of the static friction coefficients Fs and the kinetic friction coefficients Fk of the films 2 and 3 and Comparative Examples 1 and 3;

FIG. 16 is a diagram showing the respective friction coefficient points P2, P3, P4, and P6 of the films 2 and 3 and Comparative Examples 1 and 3.

DESCRIPTION OF THE PREFERRED EMBODIMENTS

Hereinafter, an embodiment of the present invention will be described with reference to the drawings. However, the scope of the invention is not limited to the illustrated examples.

A film according to an embodiment of the present invention is placed on the input surface of a pen input device that receives inputs hand-written with a pen. For example, the film is attached to the display surface of a touch-panel display device, the display surface of a tablet, or a surface of a touch pad. A pen input device according to an embodiment of the present invention is formed with an input device equipped with a touch panel, and the above film attached to the sensor surface (the display surface in the case of a touch-panel display device or a tablet) of the input device, and has the exterior shown in FIG. 15, which will be described later. When a user presses the sensor surface or performs a writing operation with a pen-shaped tool or a finger via the film, the device converts the coordinates of the pressed point or the trajectory of the writing into digital information, and outputs or stores the digital information. Particularly, in a case where a writing operation is performed with a pen-shaped tool, the user can write comfortably via the film and feels as if he/she were writing on paper with a real pen.

The film is a plastic film, and is made of polyethylene terephthalate (hereinafter abbreviated as PET), for example. Here, the characteristics of the surface of the film are defined with a static friction coefficient Fs and a kinetic friction coefficient Fk.

Specifically, in a coordinate system showing static friction coefficient values on the X-axis and kinetic friction coefficient values on the Y-axis, the point determined by a combination of the value x of the static friction coefficient Fs of the film and the value y of the kinetic friction coefficient Fk of the film falls within a region that includes the line segment expressed by the mathematical formula (1) shown below and the neighborhood of the line segment (this region will be hereinafter referred to as the comfortable writing region).

$$y=0.3071x+0.0496$$

$$0.26 \geq x \geq 0.13 \quad (1)$$

More specifically, the region that includes the above line segment and the neighborhood of the line segment is a range of ±0.10 from the line segment in the y-direction, and is a region extending to a position at a distance of ±0.03 in the x-direction from the coordinates of either end of the line segment ($0.29 \geq x \geq 0.10$).

<Method of Measuring Friction Coefficients>

Figure 1:
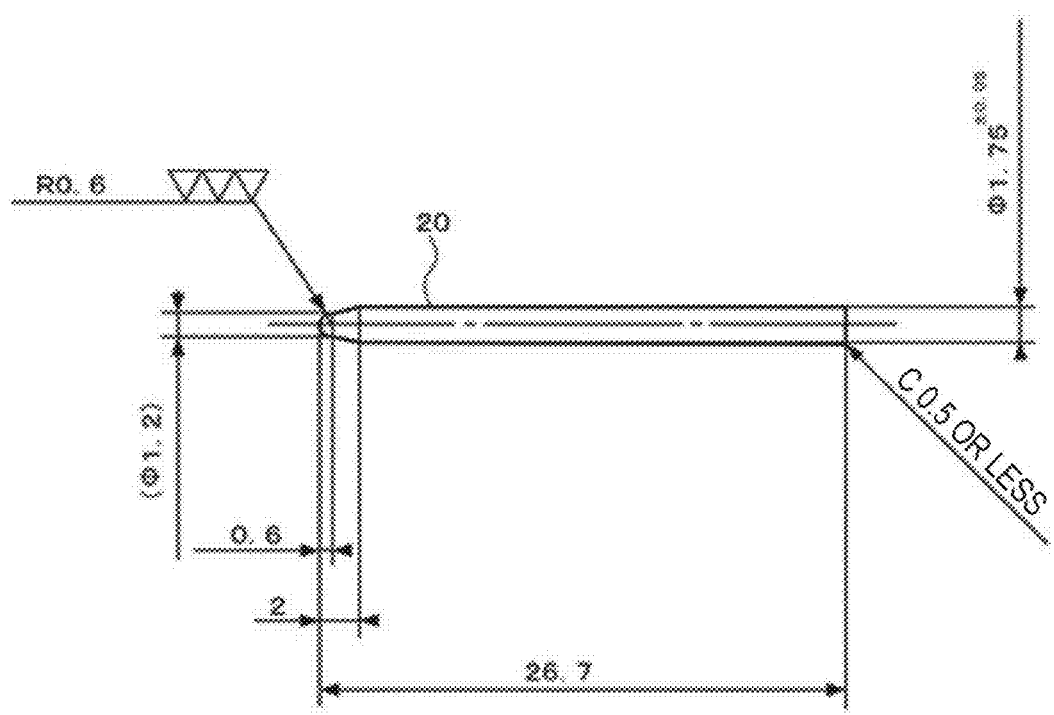
FIG. 1 is a diagram showing a pen core used in measurement.

At ordinary temperature and pressure, the values of kinetic friction coefficients Fk and static friction coefficients Fs were measured with a surface texture measuring device when an input pen was moved on the surface of a film with a load of 250 g at a speed of 5 cm/sec. The pen used here was formed by attaching a pen core 20 to a penholder for Intuos4 (a trade name), manufactured by Wacom Co., Ltd. As shown in FIG. 1, the pen core 20 made of polyethylene has a stick-like form of 26.7 mm in length, has a hemispherical tip, has a tapered portion of 1.4 mm in length, and a stick-like portion of 1.75 mm in diameter, the tapered portion connecting the hemispherical tip to the stick-like portion. The tip of the pen core 20 has a hemispherical shape of 0.6 mm in radius. TL201 Ts (a trade name or type), manufactured by Trinity-Lab Inc., was used as the measuring instrument, and Tribo Analysis Software Ver. 3.2.0 was also used.

<Method of Evaluating the Feel of Writing>

Six people evaluated the feel of writing on the display surface of a tablet terminal, ThinkPad Tablet (a trade name). A film was placed on the display surface, and each of the six people actually wrote on the display surface with a pen, and compared the feel of writing with the feel of writing on a display surface without the film. The evaluation was conducted on a scale of 1 to 7, ranging from "disliking it very much" to "liking it very much".

The specifics of the scale from 1 to 7 are as follows: 1) disliking it very much, 2) disliking it, 3) disliking it a little, 4) having no problem with using it, 5) liking it a little, 6) liking it, and 7) liking it very much.

<Films Manufactured as Examples>

The three types of films described below were manufactured as Examples of the present invention, and were evaluated. The films 1 through 3 described below were manufactured by pressing a metal mold having concavities and convexities against a resin sheet, and transferring the shapes of the concavities and convexities of the metal mold, which is a manufacturing method according to a so-called imprint technique. In this manner, sheets with intended shapes can be stably manufactured, and static friction coefficients and kinetic friction coefficients that provide optimum writing to users' liking can be stably given to the sheets.

Film 1:

This is a film manufactured by forming concavities and convexities in the surface layer of a PET film by an imprint technique with the use of a metal mold processed to have concavities and convexities of 20 μm in size, 0.8 μm in height, and 30 μm in pitch. The concavities and convexities are arranged in a houndstooth pattern. The value of the static friction coefficient Fs is 0.130, and the value of the kinetic friction coefficient Fk is 0.090.

Film 2:

This is a film manufactured by forming concavities and convexities in the surface layer of a PET film by an imprint technique with the use of a metal mold processed to have concavities and convexities of 24 μm in size, 2 μm in height, and 18 μm in pitch. The concavities and convexities are arranged in a houndstooth pattern. The value of the static friction coefficient Fs is 0.200, and the value of the kinetic friction coefficient Fk is 0.110.

Film 3:

This is a film manufactured by forming concavities and convexities in the surface layer of a PET film by an imprint technique with the use of a metal mold processed to have concavities and convexities of 30 μm in size, 4 μm in height, and 10 μm in pitch. The concavities and convexities are arranged in a houndstooth pattern. The value of the static friction coefficient Fs is 0.260, and the value of the kinetic friction coefficient Fk is 0.130.

Comparative Examples

To be compared with the above described three types of films 1 through 3 as Examples, four types of comparative films described below, and the input surfaces (the surface layers) of four types of terminals were also evaluated in terms of the feel of writing and the relationship between the static friction coefficient Fs and the kinetic friction coefficient Fk.

Comparative Example 1

This film is a PET film having a surface layer subjected to a fine particle dispersion treatment. The value of the static friction coefficient Fs is 0.276, and the value of the kinetic friction coefficient Fk is 0.106.

Comparative Example 2

This film is a PET film having a surface layer subjected to a fine particle dispersion treatment. The value of the static friction coefficient Fs is 0.180, and the value of the kinetic friction coefficient Fk is 0.075.

Comparative Example 3

This film is a PET film having a surface layer subjected to a fine particle dispersion treatment. The value of the static friction coefficient Fs is 0.260, and the value of the kinetic friction coefficient Fk is 0.099.

Comparative Example 4

This is a film manufactured by forming concavities and convexities in the surface layer of a PET film by an imprint technique with the use of a metal mold processed to have concavities and convexities of 35 μm in size, 6 μm in height, and 8 μm in pitch. The value of the static friction coefficient Fs is 0.330, and the value of the kinetic friction coefficient Fk is 0.135.

Comparative Example 5

This is the input surface (the display surface) of Galaxy Note 10.1 (a trade name), manufactured by Samsung Electronics Co., Ltd. The value of the static friction coefficient Fs is 0.160, and the value of the kinetic friction coefficient Fk is 0.118.

Comparative Example 6

This is the input surface (the display surface) of Galaxy Note 5.3 (a trade name), manufactured by Samsung Electronics Co., Ltd. The value of the static friction coefficient Fs is 0.100, and the value of the kinetic friction coefficient Fk is 0.058.

Comparative Example 7

This is the input surface (the display surface) of iPad (a trade name), manufactured by Apple, Inc. The value of the static friction coefficient Fs is 0.066, and the value of the kinetic friction coefficient Fk is 0.055.

Comparative Example 8

This is the input surface of VAIO DUO (a trade name), manufactured by Sony Corporation. The value of the static friction coefficient Fs is 0.138, and the value of the kinetic friction coefficient Fk is 0.143.

<Results of the Evaluation on the Feel of Writing>

FIG. 2 is a list of the results of the evaluation.

Three, or A, B, and C, out of the six people (A through F) evaluated the film 1 as 7 (liking it very much).

All of the six people evaluated the film 2 between 5 (liking it a little) and 6 (liking it).

Three, or D, E, and F, out of the six people evaluated the film 3 as 7 (liking it very much).

Three, or D, E, and F, out of the six people evaluated the film 1 as 2 (disliking it) or lower.

Three, or A, B, and C, out of the six people evaluated the film 3 as 2 (disliking it) or lower.

To sum up, the film 1 was liked very much by some people and was disliked very much by the others, and the film 3 was also liked very much by some people and was disliked very much by the others. The film 1 and the film 3 obtained the opposite results from each other, with the film 2 being in the middle.

Meanwhile, each of Comparative Examples 1, 4, and 5 was evaluated as 4 (having no problem with using it) by one person, but was evaluated as 3 (disliking it a little) or lower by the others.

Figure 3:
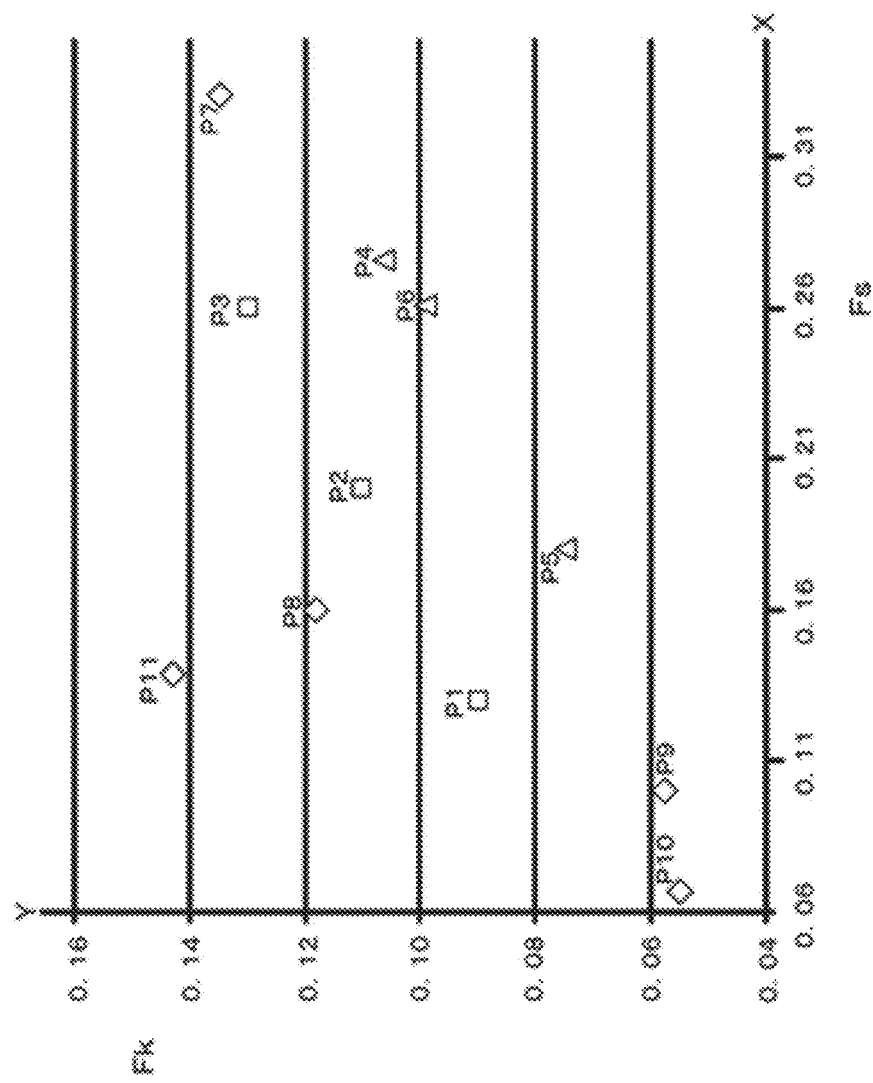
FIG. 3 is a graph in which the evaluation results shown in FIG. 2 are plotted in a coordinate system showing static friction coefficient values on the X-axis and kinetic friction coefficient values on the Y-axis.

FIG. 3 is a graph created by plotting the point (the friction coefficient point) determined by a combination of a static friction coefficient value and a kinetic friction coefficient value of each of the films 1 through 3 and Comparative Examples 1 through 8 in an X-Y coordinate system showing each static friction coefficient Fs on the X-axis and each kinetic friction coefficient Fk on the Y-axis. As can be seen from FIG. 3, the friction coefficient points P1 through P3 of the films 1 through 3 are aligned like a linear function in the X-Y coordinate system. The friction coefficient point P1 of the film 1 and the friction coefficient point P3 of the film 3 are positions where both users who like it very much and users who dislike it very much exist, and the friction coefficient point P2 of the film 2 in between is the position that is not particularly liked but is liked reasonably by both users who like the film 1 and users who like the film 3.

Evaluations on the comparative examples having friction coefficient points near the friction coefficient point P1 of the film 1 are shown as the averages among the three evaluators A, B, and C (the users who particularly like writing on the film 1), and the evaluations on the comparative examples having friction coefficient points near the friction coefficient point of the film 3 are shown as the averages among the three evaluators D, E, and F (the users who particularly like the writing on the film 3). As can be seen from those evaluations, the comparative examples having friction coefficient points near the friction coefficient point of the film 1 or 3 were highly, but not very highly, evaluated, and the comparative examples having friction coefficient points further away from the friction coefficient point of the film 1 or 3 were more poorly evaluated. From the above analysis, the friction coefficient points of the films 1 through 3 and their neighborhood regions are determined to be the region where a preferred feel of writing is achieved (the comfortable writing region).

Figure 4:
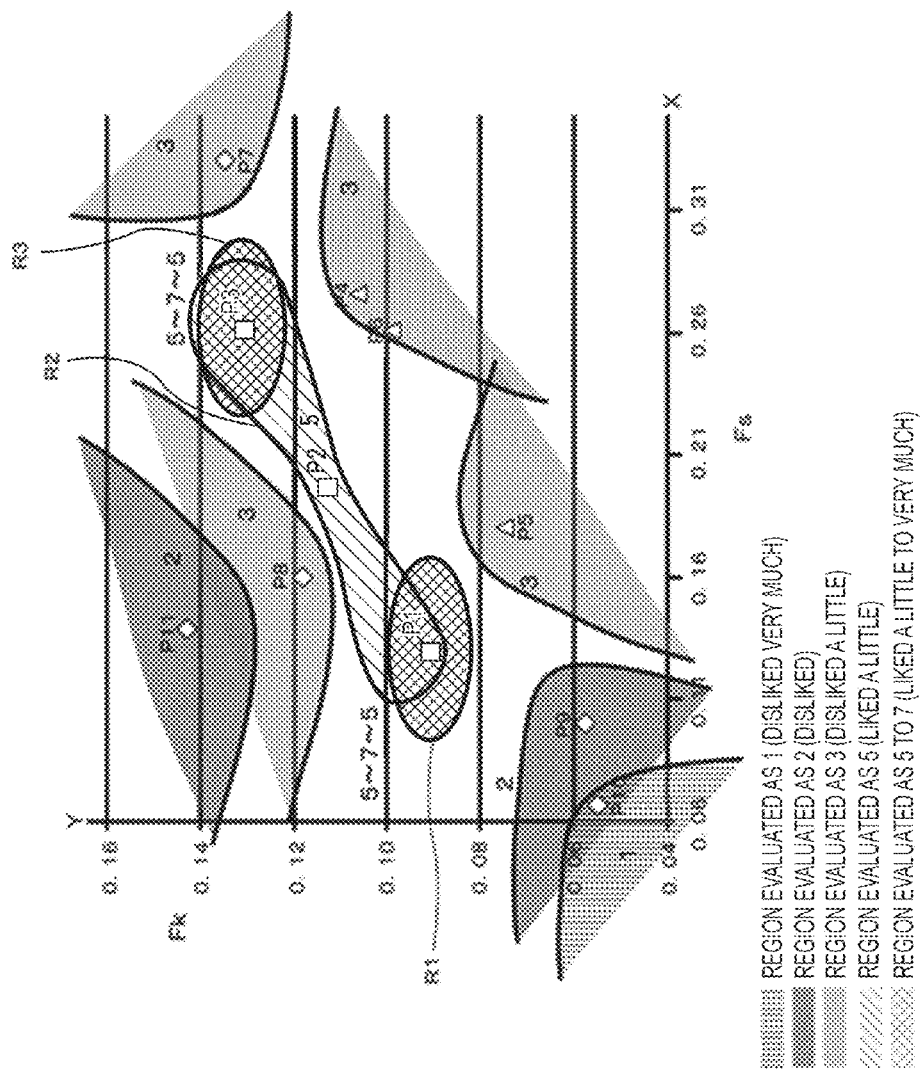
FIG. 4 is a graph in which the respective regions classified based on how writing was felt in accordance with the evaluation results shown in FIG. 2 are plotted in a coordinate system showing static friction coefficient values on the X-axis and kinetic friction coefficient values on the Y-axis.

FIG. 4 shows the results of the above analysis. A region R1 formed with the friction coefficient point P1 of the film 1 and its neighborhood, and a region R3 formed with the friction coefficient point P3 of the film 3 and its neighborhood are regions where users who particularly like the feel of writing exist. A region R2 that includes the linear function passing through the friction coefficient point P1 of the film 1, the friction coefficient point P2 of the film 2, and the friction coefficient point P3 of the film 3, and the neighborhood of the linear function is the region where many users like the feel of writing.

The above analysis results are expressed by a mathematical formula. Where x represents the value of the static friction coefficient Fs while y represents the value of the kinetic friction coefficient Fk, a film designed to have a friction coefficient point within the region (the comfortable writing region 22) that includes the line segment 21 expressed by the mathematical formula (1) shown below and the neighborhood of the line segment 21 can achieve a preferable feel of writing:

$$y=0.3071x+0.0496$$

$$0.26 \geq x \geq 0.13 \quad (1)$$

Figure 5:
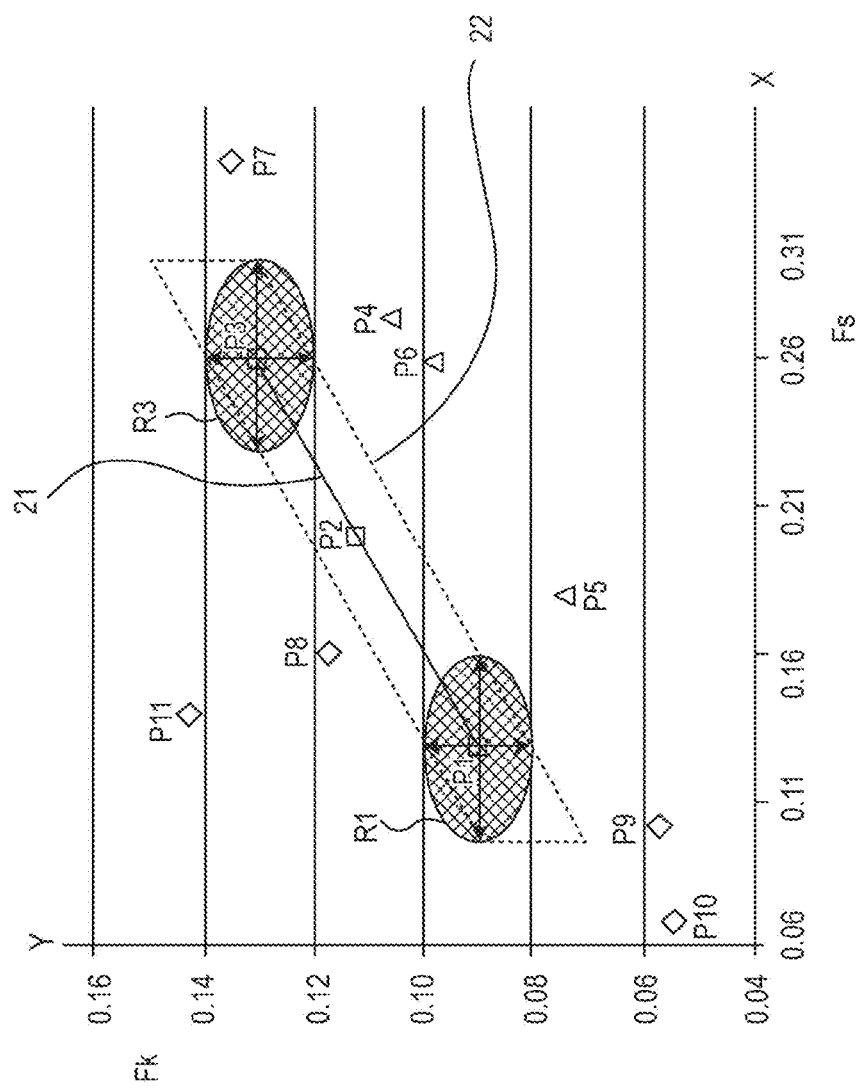
FIG. 5 is a graph showing a comfortable writing region that includes a line segment defined by a mathematical formula and the neighborhood of the line segment.

FIG. 5 shows the line segment 21 defined by the above mathematical formula and the comfortable writing region 22 that includes the line segment 21 and the neighborhood of the line segment 21 in the X-Y coordinate system showing each static friction coefficient Fs on the X-axis and each kinetic friction coefficient Fk on the Y-axis.

FIG. 5 also shows the regions R1 and R3 where there are users who particularly like the feel of writing as shown in FIG. 4.

The range of the region R1 can be expressed as follows:

$$0.16 \geq \text{the static friction coefficient value } x \geq 0.10$$

$$0.100 \geq \text{the kinetic friction coefficient value } y \geq 0.080.$$

This range represents the region where users tend to feel slipping of a pen, and is suitable for users who prefer slipperiness in writing.

The range of the region R3 can be expressed as follows:

$$0.29 \geq \text{the static friction coefficient value } x \geq 0.23$$

$$0.140 \geq \text{the kinetic friction coefficient value } y \geq 0.120.$$

This range represents the region where users tend to feel non-slip performance of a pen, and is suitable for users who prefer a non-slip feel in writing.

As the value x of the static friction coefficient Fs is restricted within the range of $0.26 \geq x \geq 0.16$ in the mathematical formula (1), it is possible to obtain a sheet that is suitable for many users who prefer a non-slip feel in writing.

<Connection Between Concavity and Convexity Formation and Slippage>

Each of the films 1 through 3 was manufactured by forming concavities and convexities in the surface layer of a PET film by an imprint technique with the use of a metal mold processed to have concavities and convexities.

Figure 6:
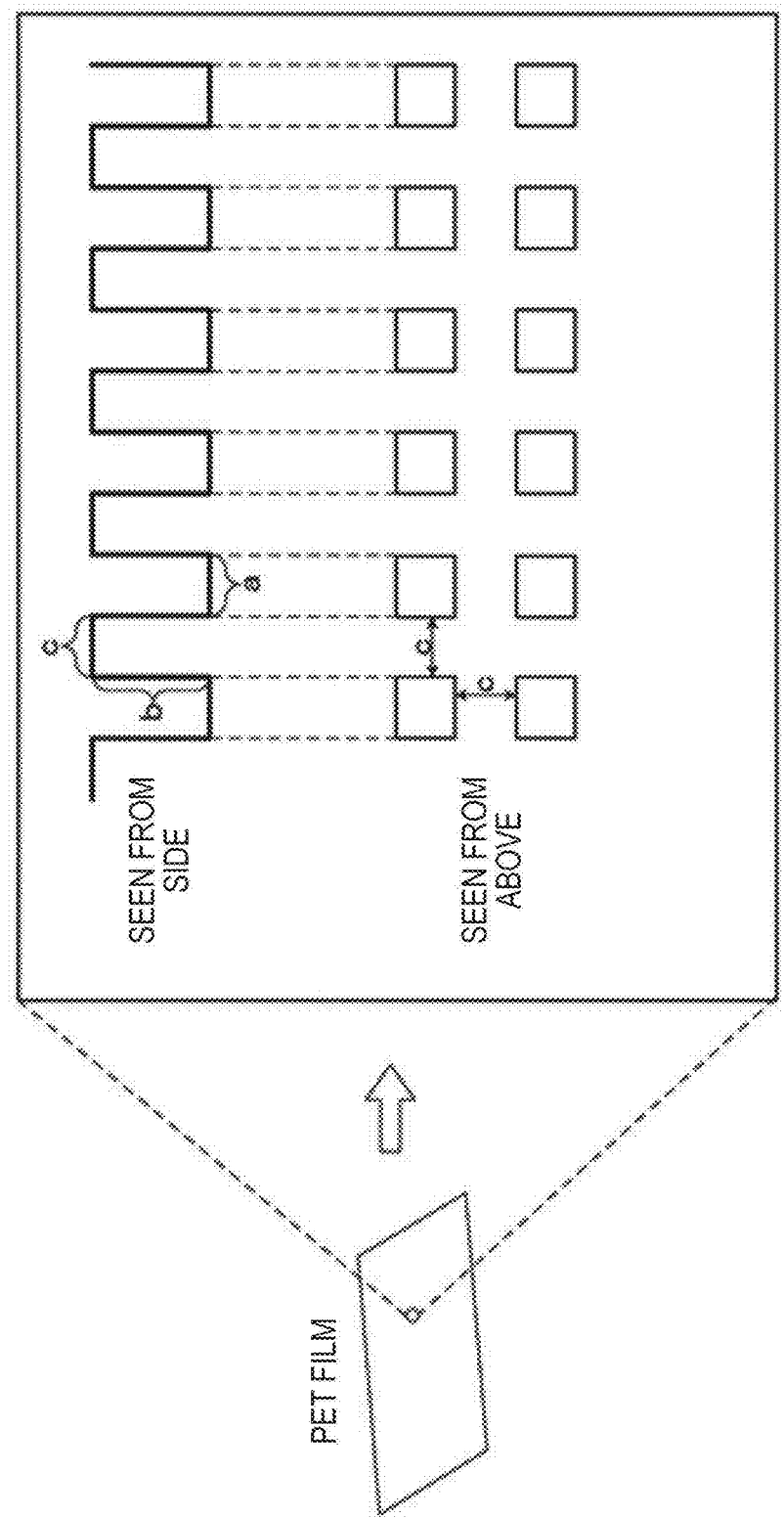
FIG. 6 is a diagram showing concavities and convexities in the surface layer of a film.

The design parameters related to the concavity and convexity formation in the surface include: concavity/convexity size (a: μm per side), concavity/convexity height (b: μm), and concavity/convexity pitch (c: μm) (see FIG. 6).

With these parameters, a film having a specific static friction coefficient value and a specific kinetic friction coefficient value can be formed.

The film 1 was manufactured with a=20 μm, b=0.8 μm, and c=30 μm, to obtain a film having a static friction coefficient Fs of 0.130 and a kinetic friction coefficient Fk of 0.090.

The film 3 was manufactured with a=30 μm, b=4 μm, and c=10 μm, to obtain a film having a static friction coefficient Fs of 0.260 and a kinetic friction coefficient Fk of 0.130.

Figure 7:
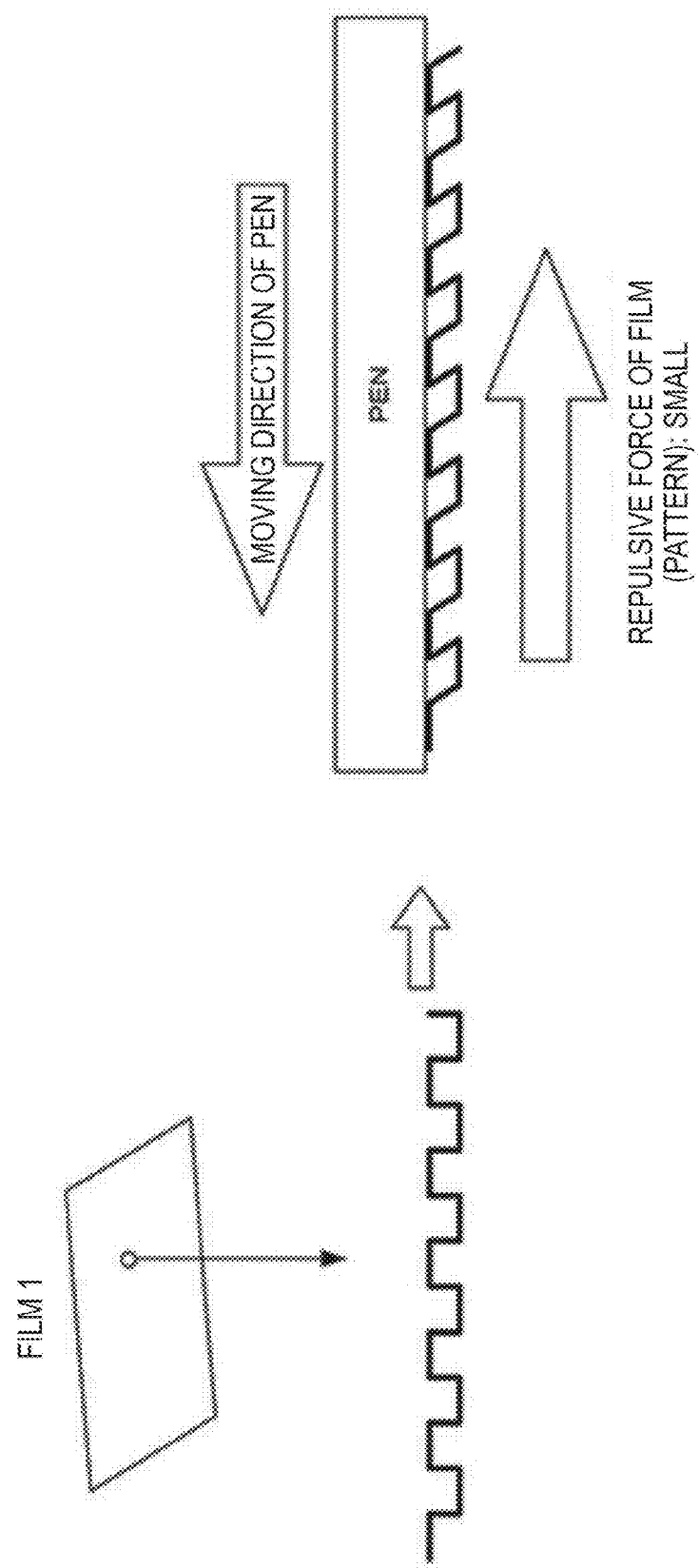
FIG. 7 is a cross-section of the surface layer of a film 1.
Figure 8:
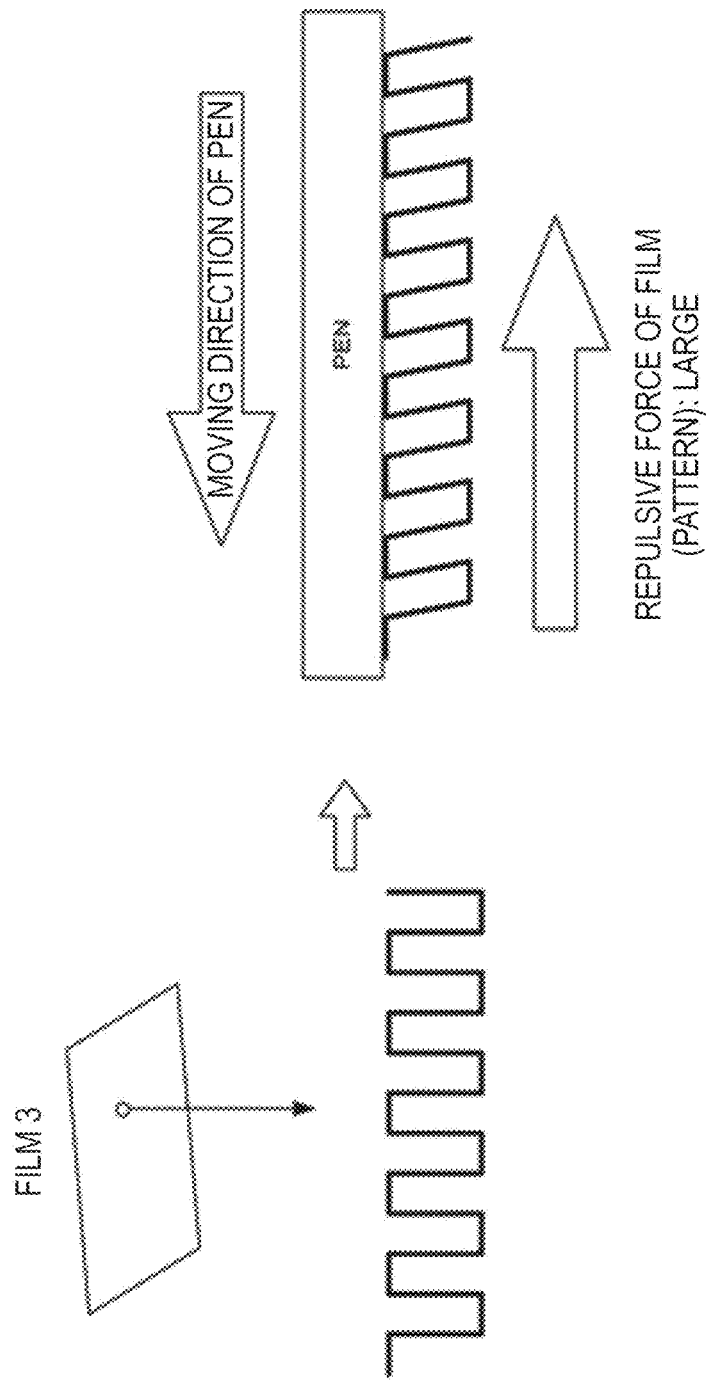
FIG. 8 is a cross-section of the surface layer of a film 3.

FIG. 7 shows a cross-section of the surface layer of the film 1. FIG. 8 shows a cross-section of the surface layer of the film 3. The film 1 is larger in the concavity/convexity size a and the concavity/convexity pitch c than the film 3, and is smaller in the concavity/convexity height b than the film 3.

When a pen is used for hand writing, the pen slides on the surface of a film having the above described concavities and convexities. In the case of the film 1, the repulsive force of the film is small (smaller than that of the film 3) relative to the force applied in the moving direction of the pen, and therefore, an evaluator feels that the pen is "slippery".

In the case of the film 3, on the other hand, the repulsive force of the film is large (larger than that of the film 1) relative to the force applied in the moving direction of the pen, and therefore, an evaluator feels that the pen is "not slippery".

As described above, the region R1 that includes the friction coefficient point P1 of the film 1 and the neighborhood of the friction coefficient point P1 is a region expressed as follows:

$$0.16 \geq \text{the static friction coefficient value } x \geq 0.10$$

$$0.100 \geq \text{the kinetic friction coefficient value } y \geq 0.080.$$

A film having its friction coefficient point within the region R1 can be obtained by setting the design parameters for the surface concavities and convexities within the numerical ranges shown below.

a=16 to 20 μm
b=0.4 to 0.9 μm
c=26 to 30 μm

As described above, the region R3 that includes the friction coefficient point P3 of the film 3 and the neighborhood of the friction coefficient point P3 is a region expressed as follows:

0.29≥the static friction coefficient value x≥0.23

0.140≥the kinetic friction coefficient value y≥0.120.

A film having its friction coefficient point within the region R3 can be obtained by setting the design parameters for the surface concavities and convexities within the numerical ranges shown below.

a=26 to 30 μm
b=1.9 to 5.6 μm
c=14 to 18 μm

Figure 9:
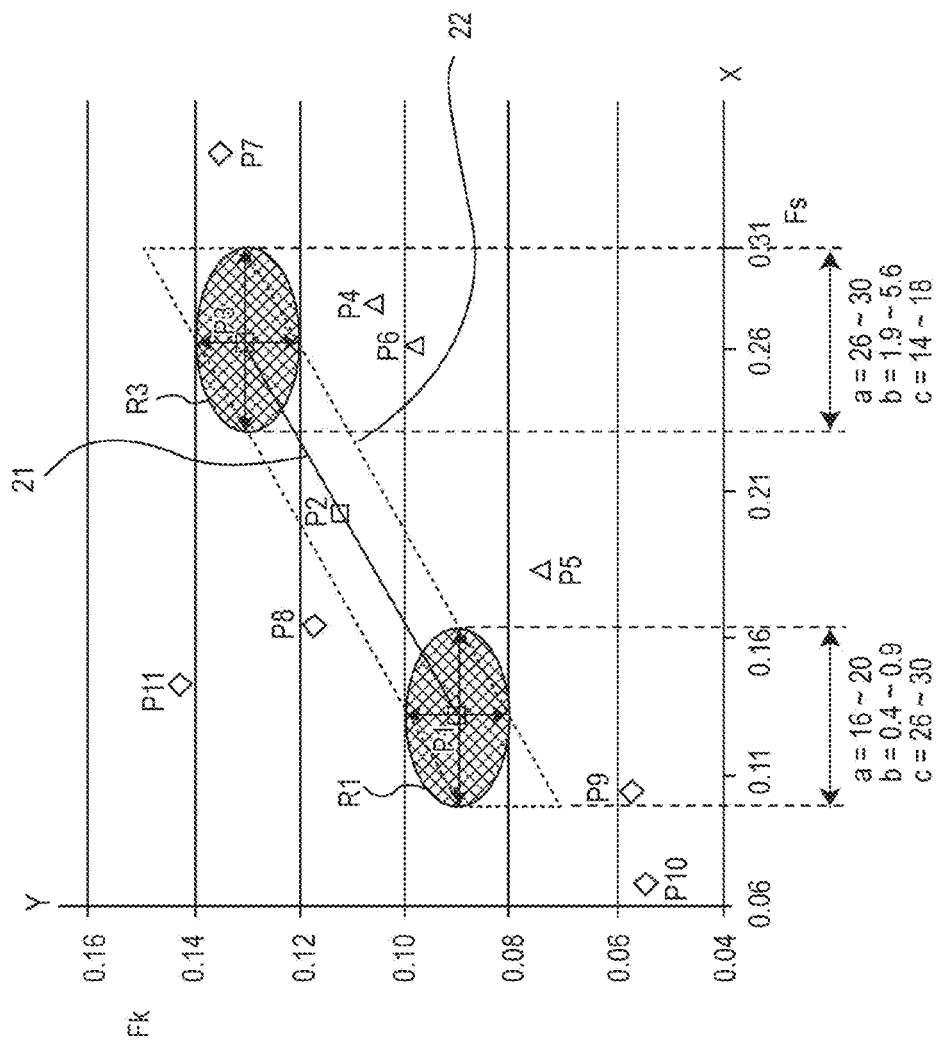
FIG. 9 is a graph showing regions R1 and R3, and the design parameters for the regions R1 and R3.

FIG. 9 shows the above aspects in a graph.

Next, the films 1 through 3 of Examples are compared with films (Comparative Examples 9, 10, and 11) that are among the films disclosed in JP 2003-296008 A, which is a cited reference, and have friction coefficient points in the vicinity of the comfortable writing region 22 of an embodiment of the present invention.

The film of Comparative Example 9 is disclosed in paragraph 0073 in JP 2003-296008 A, and has a static friction coefficient of 0.2 and a kinetic friction coefficient of 0.07. The film of Comparative Example 10 is disclosed in paragraph 0075 in JP 2003-296008 A, and has a static friction coefficient of 0.18 and a kinetic friction coefficient of 0.12. The film of Comparative Example 11 is disclosed in paragraph 0077 in JP 2003-296008 A, and has a static friction coefficient of 0.16 and a kinetic friction coefficient of 0.08.

Figure 11:
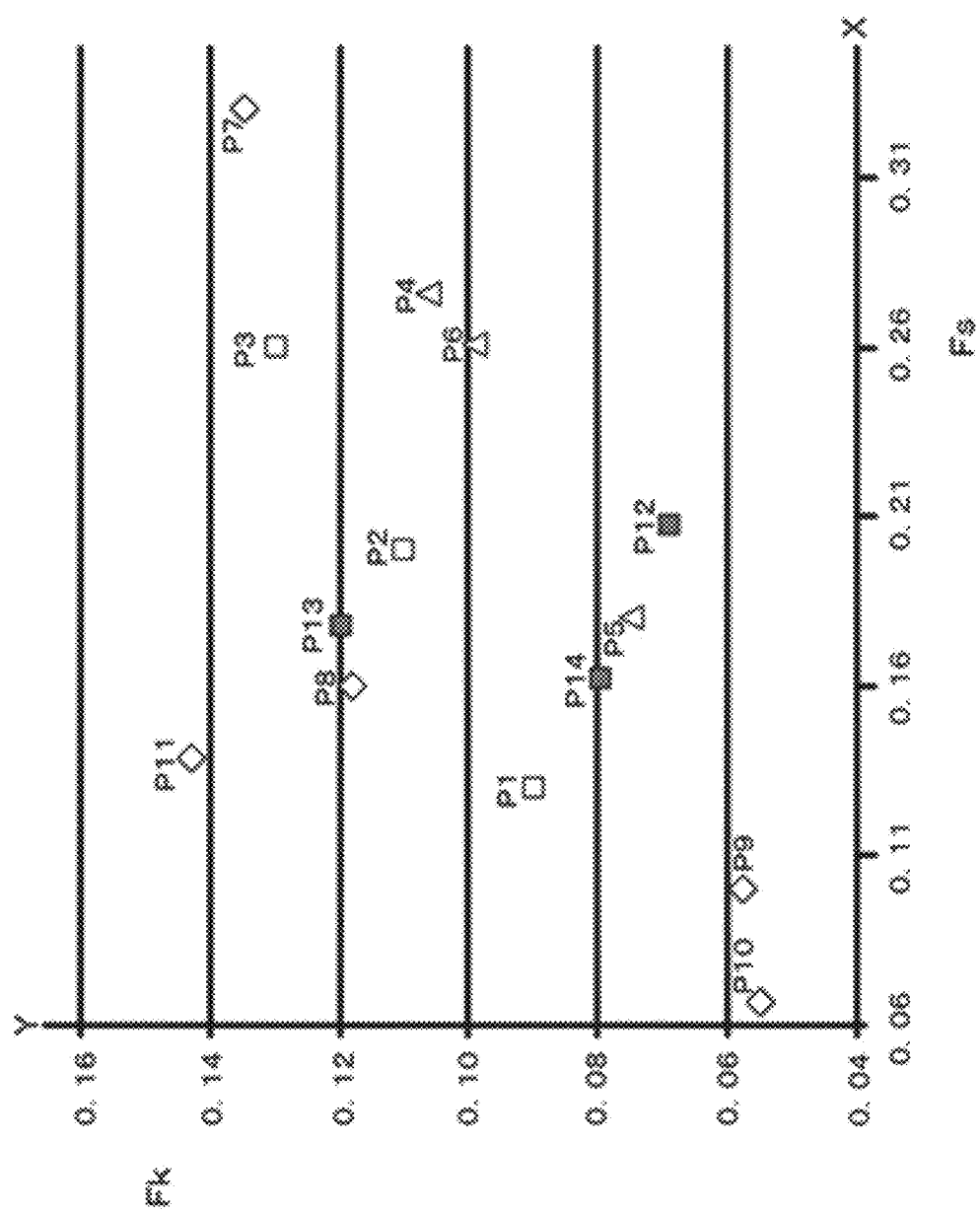
FIG. 11 is a graph created by adding the friction coefficient points P12 through P14 of Comparative Examples 9 through 11 to the graph shown in FIG. 3.
Figure 12:
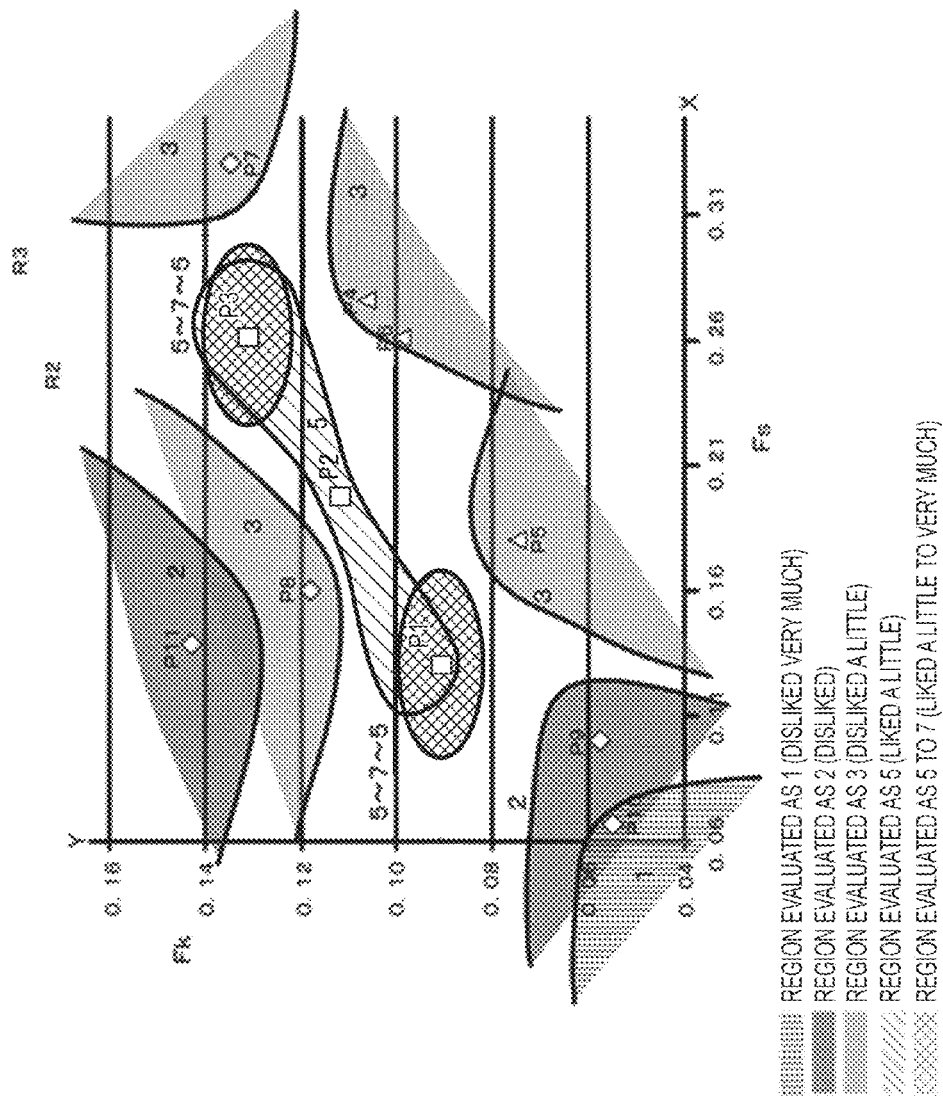
FIG. 12 is a graph created by adding the friction coefficient points P12 through P14 of Comparative Examples 9 through 11 to the graph shown in FIG. 4.

FIG. 10 is a list showing the static friction coefficients, the kinetic friction coefficients, and the like of the films 1 through 3 and Comparative Examples 9 through 11. FIG. 11 is a graph created by adding the friction coefficient points P12 through P14 of Comparative Examples 9 through 11 to the graph shown in FIG. 3. FIG. 12 is a graph created by adding the friction coefficient points P12 through P14 of Comparative Examples 9 through 11 to the graph shown in FIG. 4.

Since the friction coefficient points P12 though P14 of the films of Comparative Examples 9 through 11 fall within regions evaluated as "disliking it a little" (see FIG. 12), a preferred feel of writing is not obtained with the films of Comparative Examples 9 through 11.

Figure 13:
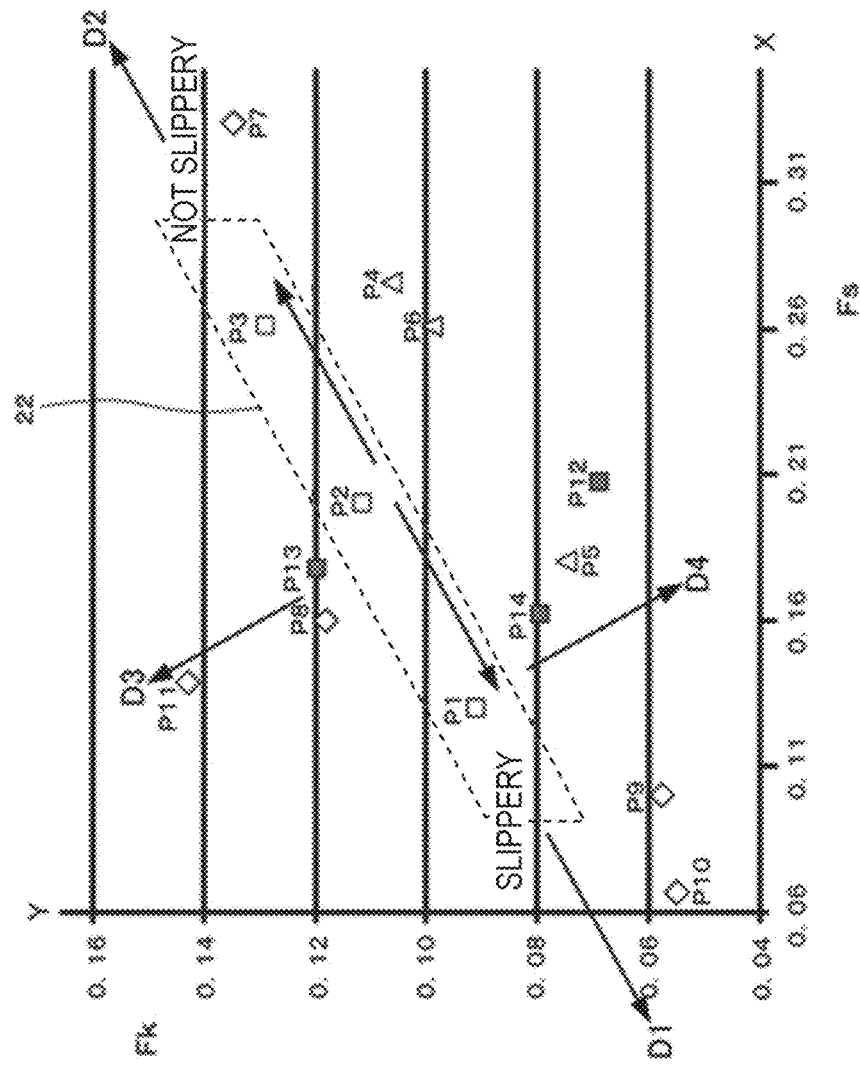
FIG. 13 is a graph showing the changes in how writing is felt as the distance from the comfortable writing region becomes longer.

FIG. 13 shows how the feel of writing changes as the distance from the comfortable writing region 22 becomes longer. As described above, one feels that a pen is slippery in a position closer to the friction coefficient point P1 of the film 1 relative to the friction coefficient point P2 of the film 2, and one feels that a pen is not slippery in a position closer to the friction coefficient point P3 of the film 3 relative to the friction coefficient point P2 of the film 2.

In view of the above described tendency, in the direction from the friction coefficient point P1 of the film 1 toward the friction coefficient point P10 of Comparative Example 7 (the direction D1 in FIG. 13), the friction force becomes too small, and the pen becomes too slippery. In the direction from the friction coefficient point P3 of the film 3 toward the friction coefficient point P7 of Comparative Example 4 (the direction D2 in FIG. 13), the friction force becomes too large, and the pen does not slide easily.

In the direction from the friction coefficient point P2 of the film 2 to the friction coefficient point P13 of Comparative Example 10 to the friction coefficient point P11 of Comparative Example 8 (the direction D3 in FIG. 13), the static friction coefficient Fs becomes smaller, and the kinetic friction coefficient Fk becomes larger. As the static friction coefficient Fs becomes smaller, the resistance at the time of initial motion becomes lower, and the starting of writing becomes quicker. As the kinetic friction coefficient Fk becomes larger, on the other hand, the resistance at a time of sliding becomes higher, and the pen does not slide smoothly unless a force is applied to the pen at the time of initial motion.

Therefore, in the direction D3 away from the comfortable writing region 22, a heavy and clinging feeling is felt in writing, and a preferred feel of writing is not obtained.

In the direction from the friction coefficient point P1 of the film 1 to the friction coefficient point P14 of Comparative Example 11 to the friction coefficient point P5 of Comparative Example 2 (the direction D4 in FIG. 13), the static friction coefficient Fs becomes larger, and the kinetic friction coefficient Fk becomes smaller. As the static friction coefficient Fs becomes larger, the resistance at the time of initial motion becomes higher, and the starting of writing becomes slower. As the kinetic friction coefficient Fk becomes smaller, the resistance at a time of sliding becomes lower, and if writing is continued with the force applied at the initial motion, the pen will move too fast.

Therefore, in the direction D4 away from the comfortable writing region 22, writing becomes more slippery, and a preferred feel of writing is not obtained.

To sum up, the feel of writing is degraded in whichever direction the friction coefficient point moves away from the comfortable writing region 22. In view of this, the comfortable writing region 22 is determined to be the range in which a preferable feel of writing can be obtained.

Next, the advantages of manufacturing a film having a desired static friction coefficient Fs and a desired kinetic friction coefficient Fk with the use of a mold having surface concavities and convexities are described.

In a film attached to the input surface of a pen input device (a pen input device having a display function) such as a tablet device having a touch screen on the display surface such as a liquid crystal display, light scattering is preferably restricted so as to avoid blurred display.

FIG. 14 shows measured haze values and the values of the static friction coefficients Fs and the kinetic friction coefficients Fk of the films 2 and 3 and Comparative Examples 1 and 3. A haze value is a value indicating the proportion of the scattered-light component in entire transmitted light. The films 2 and 3 are films manufactured with a mold having surface concavities and convexities, and Comparative Examples 1 and 3 are films manufactured by performing a fine particle dispersion treatment on surface layers.

Figure 15:
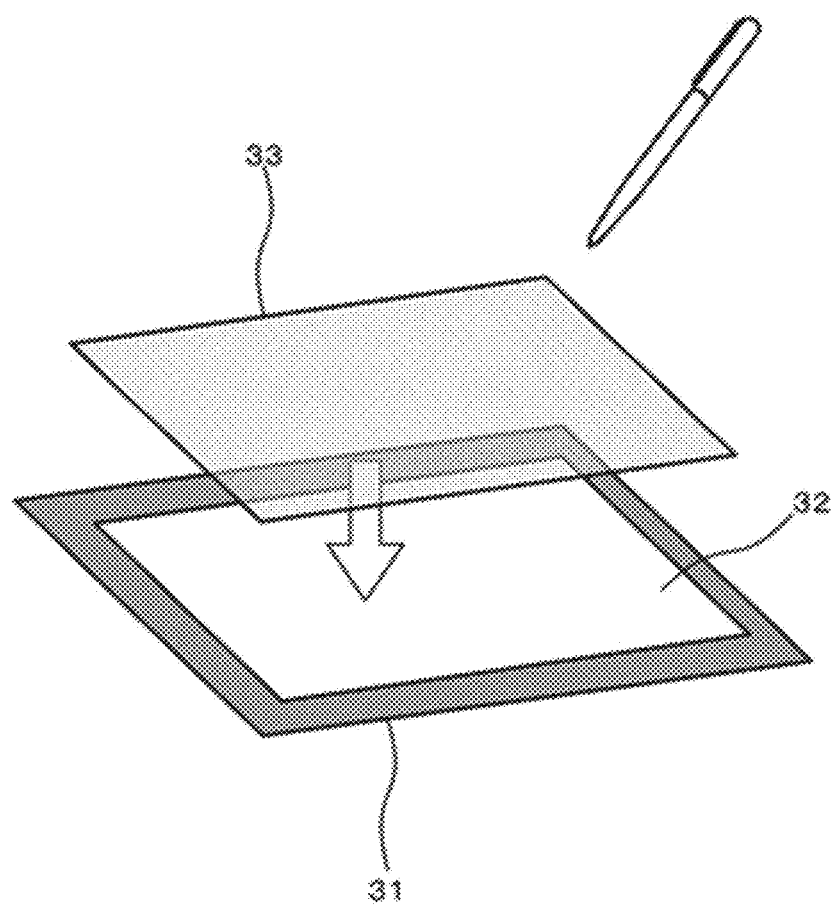
FIG. 15 is a diagram showing the exterior of a pen input device according to an embodiment of the present invention, and a haze value measurement condition.

Each of the haze values shown in the list in FIG. 14 is the average of values obtained by measuring predetermined three points on a film 33 with a measuring instrument. As shown in FIG. 15, the film 33 is attached onto the display surface 32 of a tablet device 31. The measuring instrument used here is HM-150 (compliant with JIS K7136 and JIS K7316), manufactured by Murakami Color Research Laboratory. FIG. 16 shows the respective friction coefficient points P2, P3, P4, and P6 of the films 2 and 3 and Comparative Examples 1 and 3.

The measurement results (see FIG. 14) show that the film 3 differs from Comparative Examples 1 and 3 in the value of the kinetic friction coefficient Fk, but the static friction coefficient Fs of the film 3 is substantially the same as those of Comparative Examples 1 and 3. However, the haze value of the film 3 is smaller than those of Comparative Examples 1 and 3. More specifically, the haze value of the film 3 is approximately ½ of the haze value of Comparative Example 1, and is approximately ¼ of the haze value of Comparative Example 3.

Figure 17A:
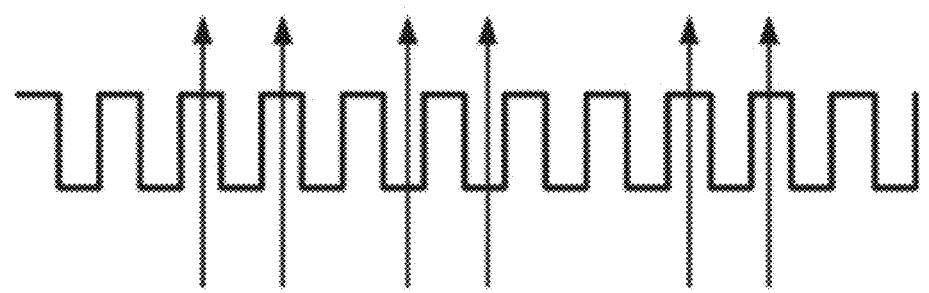
FIGS. 17A and 17B are diagrams showing light passing through a film having concavities and convexities formed in its surface, and light passing through a film having fine particles dispersed in its surface.
Figure 17B:
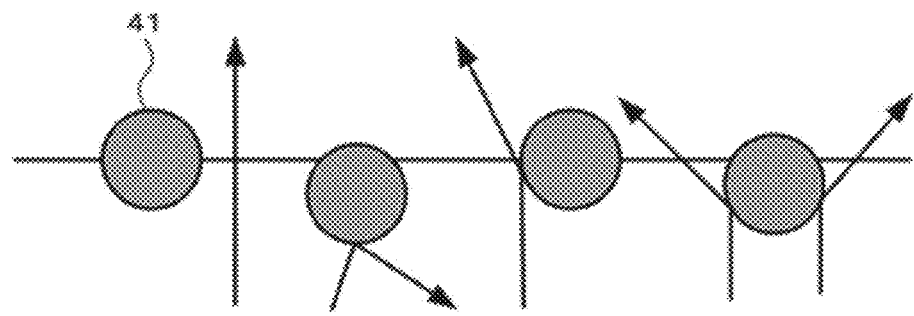

As shown in FIG. 17B, in the films of Comparative Examples 1 and 3, fine particles 41 are dispersed in the film surfaces, to obtain roughness. The friction force can be increased by achieving a higher degree of roughness. In this type of film, however, the amount of fine particles needs to be increased to achieve a higher degree of roughness. Due to those fine particles, display light is scattered, resulting in a larger haze value.

Meanwhile, with the mold that has surface concavities and convexities and was used in manufacturing the films 1 through 3, the surface can have roughness in such a manner as to prevent light scattering, as shown in FIG. 17A. As a result, even if the roughness of the surface is increased to achieve a larger friction force, only the amounts of concavities and convexities become larger, and there are no changes in the shapes of the concavities and convexities. Accordingly, with a mold having surface concavities and convexities, the friction coefficient value can be made larger while influence on haze is reduced more efficiently than in a conventional case where fine particles are used.

Although embodiments of the present invention have been described so far with reference to the accompanying drawings, specific structures are not limited to the embodiments described above, and modifications and additions may be made to them without departing from the scope of the invention.

In the embodiments, films that have friction coefficient points in the comfortable writing region 22 have been described as preferred examples manufactured with a mold having surface concavities and convexities. However, films can be manufactured by any other method, as long as the friction coefficient points falls within the comfortable writing region 22.

The material of each film is not limited to polyethylene terephthalate used in the embodiments.

This application is based on Japanese Patent Application No. 2013-252543, filed on Dec. 5, 2013, the entire contents of which are incorporated by reference herein.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A film placed on an input surface of a pen input device, wherein a point determined by a combination of a static friction coefficient value x and a kinetic friction coefficient value y obtained when an input pen is moved on a surface of the film with an applied load of 250 g at a speed of 5 cm/sec falls within a region including a line segment and a neighborhood of the line segment in a coordinate system showing a static friction coefficient on the X-axis and a kinetic friction coefficient on the Y-axis, the line segment being expressed as $y=0.3071x+0.0496$ $0.26 \geq x \geq 0.13$, the static friction coefficient value x and the kinetic friction coefficient value y falling within ranges expressed as $0.16 \geq$ the static friction coefficient value $x \geq 0.10$ $0.100 \geq$ the kinetic friction coefficient value $y \geq 0.080$, size a, height b, and pitch c of concavities and convexities in the surface falling within ranges expressed as $20 \ \mu m \geq a \geq 16 \ \mu m$ $0.9 \ \mu m \geq b \geq 0.4 \ \mu m$ $30 \ \mu m \geq c \geq 26 \ \mu m$.

2. The film according to claim 1, wherein the concavities and convexities in the surface are formed by pressing a metal mold against a surface layer by an imprint technique, the metal mold having concavities and convexities.

3. The film according to claim 1, which is made of polyethylene terephthalate (PET).

4. A film placed on an input surface of a pen input device, wherein a point determined by a combination of a static friction coefficient value x and a kinetic friction coefficient value y obtained when an input pen is moved on a surface of the film with an applied load of 250 g at a speed of 5 cm/sec falls within a region including a line segment and a neighborhood of the line segment in a coordinate system showing a static friction coefficient on the X-axis and a kinetic friction coefficient on the Y-axis, the line segment being expressed as $y=0.3071x+0.0496$ $0.26 \geq x \geq 0.13$, the static friction coefficient value x and the kinetic friction coefficient value y falling within ranges expressed as $0.29 \geq$ the static friction coefficient value $x \geq 0.23$ $0.140 \geq$ the kinetic friction coefficient value $y \geq 0.120$, size a, height b, and pitch c of concavities and convexities in the surface falling within ranges expressed as $30 \ \mu m \geq a \geq 26 \ \mu m$ $5.6 \ \mu m \geq b \geq 1.9 \ \mu m$ $18 \ \mu m \geq c \geq 14 \ \mu m$.

5. The film according to claim 4, wherein the concavities and convexities in the surface are formed by pressing a metal mold against a surface layer by an imprint technique, the metal mold having concavities and convexities.

6. The film according to claim 4, which is made of polyethylene terephthalate (PET).

7. A pen input device comprising:
a film; and
a sensor surface having the film attached thereto,
wherein a point determined by a combination of a static friction coefficient value x and a kinetic friction coefficient value y obtained when an input pen is moved on a surface of the film with an applied load of 250 g at a speed of 5 cm/sec falls within a region including a line segment and a neighborhood of the line segment in a coordinate system showing a static friction coefficient on the X-axis and a kinetic friction coefficient on the Y-axis, the line segment being expressed as $y=0.3071x+0.0496$ $0.26 \geq x \geq 0.13$, the static friction coefficient value x and the kinetic friction coefficient value y fall within ranges expressed as $0.16 \geq$ the static friction coefficient value $x \geq 0.10$ $0.100 \geq$ the kinetic friction coefficient value $y \geq 0.080$, and size a, height b, and pitch c of concavities and convexities in the surface fall within ranges expressed as $20 \ \mu m \geq a \geq 16 \ \mu m$ $0.9 \ \mu m \geq b \geq 0.4 \ \mu m$ $30 \ \mu m \geq c \geq 26 \ \mu m$.

8. A pen input device comprising:
a film; and
a sensor surface having the film attached thereto,
wherein a point determined by a combination of a static friction coefficient value x and a kinetic friction coefficient value y obtained when an input pen is moved on a surface of the film with an applied load of 250 g at a speed of 5 cm/sec falls within a region including a line segment and a neighborhood of the line segment in a coordinate system showing a static friction coefficient on the X-axis and a kinetic friction coefficient on the Y-axis, the line segment being expressed as $y=0.3071x+0.0496$ $0.26 \geq x \geq 0.13$, the static friction coefficient value x and the kinetic friction coefficient value y fall within ranges expressed as $0.29 \geq$ the static friction coefficient value $x \geq 0.23$ $0.140 \geq$ the kinetic friction coefficient value $y \geq 0.120$, and size a, height b, and pitch c of concavities and convexities in the surface fall within ranges expressed as $30 \ \mu m \geq a \geq 26 \ \mu m$ $5.6 \ \mu m \geq b \geq 1.9 \ \mu m$ $18 \ \mu m \geq c \geq 14 \ \mu m$.

\* \* \* \* \*